United States Patent
Nishikawa et al.

(10) Patent No.: US 11,765,019 B2
(45) Date of Patent: Sep. 19, 2023

(54) NETWORK MANAGEMENT APPARATUS, METHOD, AND PROGRAM

(71) Applicant: NIPPON TELEGRAPH AND TELEPHONE CORPORATION, Tokyo (JP)

(72) Inventors: Shohei Nishikawa, Musashino (JP); Masataka Sato, Musashino (JP); Kenji Murase, Musashino (JP); Kimihiko Fukami, Musashino (JP); Kenichi Tayama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/800,781

(22) PCT Filed: Feb. 21, 2020

(86) PCT No.: PCT/JP2020/007109
§ 371 (c)(1),
(2) Date: Aug. 18, 2022

(87) PCT Pub. No.: WO2021/166228
PCT Pub. Date: Aug. 26, 2021

(65) Prior Publication Data
US 2023/0099411 A1    Mar. 30, 2023

(51) Int. Cl.
*H04L 41/0677* (2022.01)
*H04L 43/091* (2022.01)

(52) U.S. Cl.
CPC ........ *H04L 41/0677* (2013.01); *H04L 43/091* (2022.05)

(58) Field of Classification Search
CPC .......................... H04L 41/0677; H04L 43/091
(Continued)

(56) References Cited

U.S. PATENT DOCUMENTS 8,099,527 B2 *  1/2012  Suzuki .................. H04L 41/142
                                                    709/224
8,341,463 B2 * 12/2012  Kikuchi .............. G06F 11/0751
                                                    709/224
(Continued)

FOREIGN PATENT DOCUMENTS

JP     201238028 A    2/2012
JP     201672668 A    5/2016
JP     201878523 A    5/2018

OTHER PUBLICATIONS

Masataka Sato et al., Study of Variable Management Architecture for Diverse Networks, IEICE Technical Report, vol. 116, No. 324, 2016, pp. 37-42.
(Continued)

*Primary Examiner* — Melvin H Pollack
(74) *Attorney, Agent, or Firm* — Harness, Dickey & Pierce, P.L.C.

(57) ABSTRACT

A network management apparatus according to an embodiment includes a storage device configured to store information indicating connection relationships between a plurality of communication devices and communication paths in a network configuration and rank information indicating ranks of the plurality of communication devices in the network configuration and a determination unit configured to, when a fault has occurred in a communication device, determine that a communication device influenced by the fault is within a fault influence range based on the information stored in the storage device.

8 Claims, 23 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 10,547,521 B1* | 1/2020 | Roy | .................... | H04L 41/0895 |
| 2011/0302291 A1* | 12/2011 | Draugelis | ........... | H04L 63/1408 |
| | | | | 709/224 |
| 2012/0066376 A1* | 3/2012 | Nagura | .............. | H04L 63/1416 |
| | | | | 709/224 |
| 2014/0136690 A1* | 5/2014 | Jain | .................... | H04L 41/5022 |
| | | | | 709/224 |
| 2014/0222998 A1* | 8/2014 | Vasseur | .................. | H04L 41/16 |
| | | | | 709/224 |
| 2015/0095488 A1* | 4/2015 | Sutou | ................. | G06F 11/3409 |
| | | | | 709/224 |
| 2015/0350019 A1* | 12/2015 | Terayama | .......... | G06F 11/3031 |
| | | | | 709/224 |
| 2017/0295221 A1* | 10/2017 | Imamura | ............. | H04L 67/1008 |
| 2018/0184360 A1* | 6/2018 | Cavalcanti | ........ | H04W 52/0261 |
| 2018/0188083 A1* | 7/2018 | Moriyama | ............. | G01D 21/02 |
| 2018/0351840 A1* | 12/2018 | Kondo | .................. | H04L 41/065 |
| 2018/0367368 A1* | 12/2018 | Schulz | ............... | G05B 19/4186 |
| 2019/0207807 A1* | 7/2019 | Mikhail | ................. | H04L 41/145 |
| 2019/0207826 A1* | 7/2019 | Kondo | .................... | H04L 67/51 |
| 2019/0306731 A1* | 10/2019 | Raghuramu | .......... | H04L 67/303 |
| 2019/0334795 A1* | 10/2019 | Terayama | ........... | H04L 41/0895 |
| 2019/0389599 A1* | 12/2019 | Dillard | ................ | G07C 5/0825 |
| 2020/0127906 A1* | 4/2020 | Malboubi | ........... | H04L 43/0852 |
| 2020/0241949 A1* | 7/2020 | Basu | .................... | G06F 11/0775 |
| 2021/0200616 A1* | 7/2021 | Xu | ......................... | G06F 3/0617 |
| 2021/0274558 A1* | 9/2021 | Takata | .................. | H04L 5/0048 |
| 2021/0282143 A1* | 9/2021 | Lee | ...................... | H04W 52/281 |

OTHER PUBLICATIONS

Kimihiko Fukami et al., Study on Method of Identifying Service Influence Occurred by Network Fault, IEICE Technical Report, vol. 118, No. 483, 2019, pp. 13-18.

* cited by examiner

Fig. 2

| ITEM NAME (PRSpec ATTRIBUTE NAME) | VALUE | DESCRIPTION |
|---|---|---|
| commonName | | Names written in a format that allows people to identify the use, purpose, user, and the like of this Spec |
| objectId | | Identifier uniquely identifying PhysicalResourceSpec |
| resourceSpecCharacteristic | (Refer to characteristics information) | Item that determines characteristics of PhysicalResource Refer to characteristics information in other tables |
| modelNumber | Device type | Attribute representing model number of this Spec |
| partNumber | | Attribute representing product number of this Spec |
| skuNumber | Rank information (integer) | Attribute representing rank information of this Spec Smaller number represents higher ranked device |
| vendorName | | Attribute representing vendor name of this Spec |
| nttSpecHierarchyInfo | | Information relating to inheritance hierarchy of PRSpec |
| isAbstract | | Attribute representing whether Spec is abstract |
| baseResourceSpec | | Refer to inheritance source Spec |
| nttSpecType | "PD" | Represent type of this PRSpec |

NETWORK MANAGEMENT APPARATUS, METHOD, AND PROGRAM

CROSS-REFERENCE TO RELATED APPLICATIONS

This application is a 371 U.S. National Phase of International Application No. PCT/JP2020/007109, filed on Feb. 21, 2020. The entire disclosure of the above application is incorporated herein by reference.

TECHNICAL FIELD

Embodiments of the present invention relate to a network management apparatus, method, and program.

BACKGROUND ART

There is a technology (see, for example, NPL 2) that achieves the identification of a range of network services involved with a fault location and the determination of the influenced users on which a fault has had an influence, regardless of the types of the physical and logical layers, according to a common method, using a technology that holds and displays components of the physical and logical layers of networks implemented with a plurality of network devices, regardless of changes in the types and protocols of network devices, according to a common method (see, for example, PTL 1 and NPL 1).

For example, in a method of determining the influence on services according to the technology of the related art, devices connected to both ends of a network connection (NC) which is influenced by a fault are determined to be equally influenced devices. An NC indicates an end-to-end connectivity between two devices.

That is, only the two devices connected to both ends of the NC that is influenced by a fault are determined to be influenced devices.

CITATION LIST

Patent Literature

PTL 1: JP 2018-078523 A

Non Patent Literature

NPL 1: Masataka SATO, Kazuaki AKASHI, Shingo HORIUCHI, Tadashi KOTANI, "Study of Variable Management Architecture for Diverse Networks," IEICE Technical Report, vol. 116, no. 324, ICM 2016-31, pp. 37-42, November 2016.
NPL 2: Kimihiko FUKAMI, Kenji MURASE, Masataka SATO, Kenichi TAYAMA, "Study on Method of Identifying Service Influence Occurred by Network Fault," IEICE Technical Report, vol. 118, no. 483, ICM 2018-51, pp. 13-18, March 2019.

SUMMARY OF THE INVENTION

Technical Problem

First, in the above technology, hierarchical relationships of devices (hereinafter referred to as facility ranks) are not taken into consideration and two devices connected to both ends of an influenced NC are determined to be equally influenced. However, in reality, of devices connected to both ends of an NC, a device of a higher rank (hereinafter sometimes referred to as a higher ranked device) is not always influenced.

Second, when a device that has been determined to be influenced is connected to a device of a lower rank than it (hereinafter sometimes referred to as a lower ranked device) or a device of an identical rank (hereinafter sometimes referred to as an identical ranked device), this device will also be influenced.

Third, in the related art, the influence is determined without taking into consideration a redundant configuration due to device ranks.

However, in reality, a lower ranked device often forms a redundant configuration with two higher ranked devices, and even if one of the higher ranked devices fails, the lower ranked device can communicate with the other higher ranked device and thus the lower ranked device should be determined as being one-side system failure because the lower ranked device is running with one-side system. However, in the related art, the lower ranked device is determined to be both-side system failure because it is not possible to determine the influence taking into consideration redundant configurations.

Thus, it is not possible to accurately determine the influence, it takes time to perform the influence determination task in monitoring and maintenance work, and it is not possible to achieve fast recovery in the event of a disaster.

The present invention has been made in view of the above circumstances and it is an object of the present invention to provide a network management apparatus, method, and program capable of appropriately determining the influence of a fault that has occurred.

Means for Solving the Problem

A network management apparatus according to an aspect of the present invention includes a storage device configured to store information indicating connection relationships between a plurality of communication devices and communication paths in a network configuration and rank information indicating ranks of the plurality of communication devices in the network configuration and a determination unit configured to, when a fault occurs in a communication device of the plurality of communication devices, determine that a communication device influenced by the fault is within a fault influence range based on the information stored in the storage device.

A network management method according to an aspect of the present invention is a method performed by a network management apparatus including a storage device configured to store information indicating connection relationships between a plurality of communication devices and communication paths in a network configuration and rank information indicating ranks of the plurality of communication devices in the network configuration, the method including determining, when a fault occurs in a communication device of the plurality of communication devices, that a communication device influenced by the fault is within a fault influence range based on the information stored in the storage device.

Effects of the Invention

According to the present invention, it is possible to appropriately determine the influence of a fault that has occurred in a network.

BRIEF DESCRIPTION OF DRAWINGS

FIG. 2 is a diagram illustrating examples of definitions of network facility information in a table format.

DESCRIPTION OF EMBODIMENTS

Hereinafter, an embodiment according to the present invention will be described with reference to the drawings.

First Embodiment

First, a first embodiment of the present invention will be described.

Figure 1:
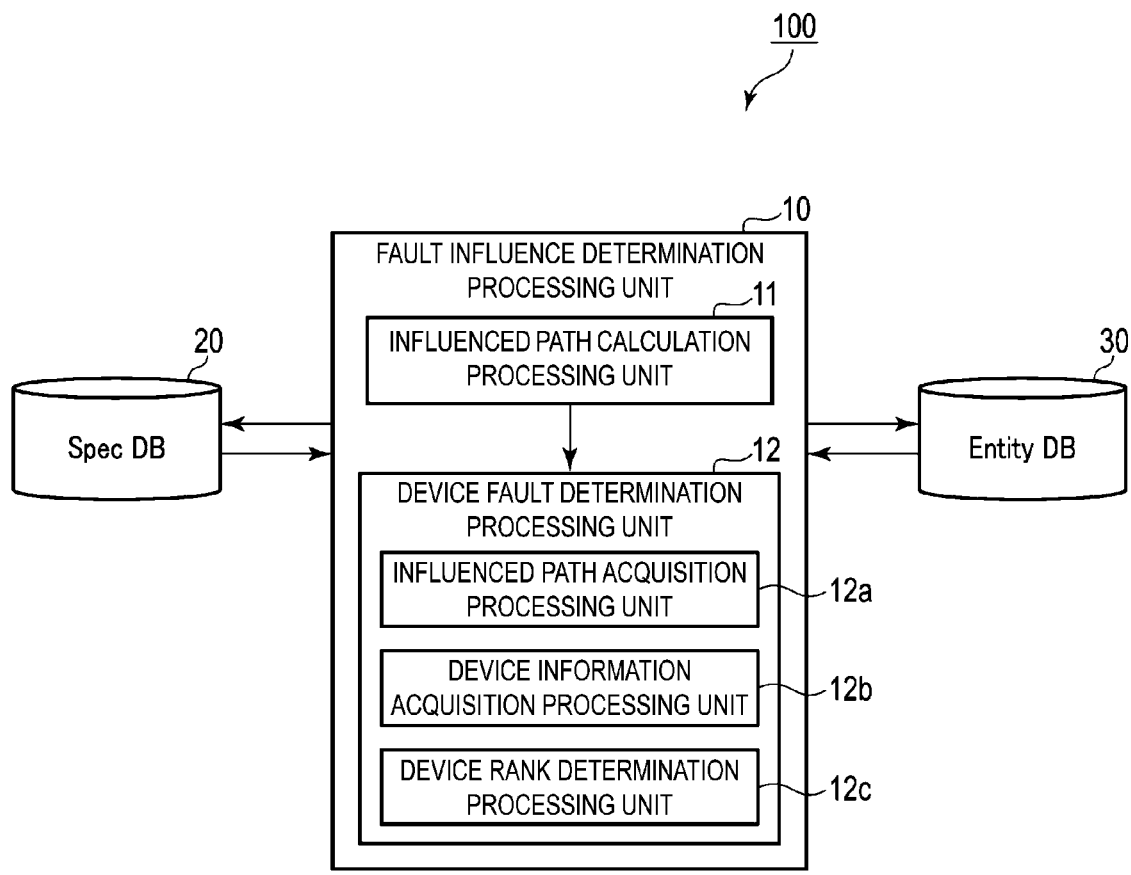
FIG. 1 is a diagram illustrating an exemplary application of a network management apparatus according to a first embodiment of the present invention.

FIG. 1 is a diagram illustrating an exemplary application of a network management apparatus according to the first embodiment of the present invention.

As illustrated in FIG. 1, the network management apparatus 100 according to the first embodiment of the present invention includes a fault influence determination processing unit 10, a specification (Spec) database (DB) 20, and an entity database 30.

The fault influence determination processing unit 10 includes an influenced path calculation processing unit 11 and a device fault determination processing unit 12. The device fault determination processing unit 12 includes an influenced path acquisition processing unit 12a, a device information acquisition processing unit 12b, and a device rank determination processing unit 12c.

The specification database 20 stores network facility information (specifications (Spec)).

The entity database 30 stores network facility information (entities). This facility information defines (1) relationships between objects in the physical layer, (2) relationships between objects in the logical layer, and (3) relationships between the objects in the physical layer and the objects in the logical layer.

Entities (information objects) including physical structures (PSs), physical devices (PDs), physical ports (PPs), aggregate sections (ASs), physical links (PLs), and physical connectors (PCs) can be applied as components of the physical layer. Entities including topological links (TLs), network forwarding domains (NFDs), termination point encapsulations (TPEs), network connections (NCs), link connections (LCs) and cross (X) connections (XC) can be applied as components of the logical layer. Such an application ensures that the components of the physical and logical layers can be held in a unified format.

Entity names of the physical layer can be classified into the PS, PD, PP, AS, PL, and PC described above. "Entity name: Meaning: Correspondence" of each entity name is as follows.

PS: Facility such as accommodation building or manhole: Facility object
   PD: Device: Device object
   PP: Communication port of device: Port object
   AS: Cable: Medium object
   PL: Cable core: Medium object
   PC: Cable connector: Medium object Entity names of the logical layer can be classified into the TL, NFD, TPE, NC, LC, and XC described above. "Entity name: Meaning: Correspondence" of each entity name is as follows.

TL: Connectivity between devices (in logical device layer (sometimes called LD layer)): Line object
NFD: Range in which transmission is possible within device (in logical device layer): Line or surface object
TPE: Communication end point: Point object
NC: End-to-end connectivity (in communication layer) formed of link connections (LCs) and cross (X) connections (XC): Communication object
LC: Connectivity between devices (in communication layer): Line or surface object
XC: Connectivity within device (in communication layer): Line or surface object Next, specifications (of the physical layer) of the facility information will be explained. Attributes that are unique information such as device names or cable types in the physical layer are held in the specification database 20 as information that instantiates specification classes (defining attributes representing characteristics). Specifically, the following specification classes are defined.

"Spec name: Meaning" of each specification class in the physical layer is as follows.

Physical structure specifications (PS Spec): Defines attributes unique to each PS Physical device specifications (PD Spec): Defines attributes unique to each PD Physical port specifications (PP Spec): Defines attributes unique to each PP Aggregate section specifications (AS Spec): Defines attributes unique to each AS Physical link specifications (PL Spec): Defines attributes unique to each PL Physical connector specifications (PC Spec): Defines attributes unique to each PC Next, specifications (of the logical layer) of the facility information will be explained. Attributes unique to each layer (such as a VLANID, an IP address, and a wavelength number) in the logical layer are held in the specification database 20 as information that instantiates specification classes. Specifically, the following specification classes are defined.

"Spec name: Meaning" of each specification class in the logical layer is as follows.

Topological link specifications (TL Spec): Defines attributes unique to each TL

Network forwarding domain specifications (NFD Spec): Defines attributes unique to each NFD Termination point encapsulation specifications (TPE Spec): Defines attributes unique to each TPE Network connection specifications (NC Spec): Defines attributes unique to each NC Link connection specifications (LC Spec): Defines attributes unique to each LC Cross (X) connection specifications (XC Spec): Defines attributes unique to each XC Also, attributes common to the layers and their values are held in the entity database 30 as information that instantiates entity classes.

FIG. 2 is a diagram illustrating examples of definitions of network facility information in a table format.

Item names and values of facility information stored in the specification database 20 are defined as shown in FIG. 2.

In the example illustrated in FIG. 2, attributes representing rank information (skuNumber) of a plurality of devices (PDs) on the same communication path are defined.

This device rank information can be arbitrarily added and modified by the user.

The rank information is defined such that a device with a smaller numerical value is a device of a higher rank (hereinafter sometimes referred to as a higher ranked device) and a device with a larger numerical value is a device of a lower rank (hereinafter sometimes referred to as a lower ranked device). That is, the network facility information in the present embodiment includes rank information of a plurality of communication devices capable of communicating via communication paths.

In the present embodiment, rank information of devices is taken into consideration and a logic in which, of devices corresponding to both ends of an NC, only a lower ranked device is influenced by the occurrence of a fault and a higher ranked device is not influenced by the occurrence of the fault is achieved in a unified manner, regardless of services and network configurations.

As a result, in a configuration in which devices corresponding to both ends of an NC have a hierarchical relationship, the influence of the occurrence of a fault is calculated more accurately, the influence determination task in monitoring and maintenance work is reduced, and fast recovery is achieved in the event of a disaster.

Figure 3:
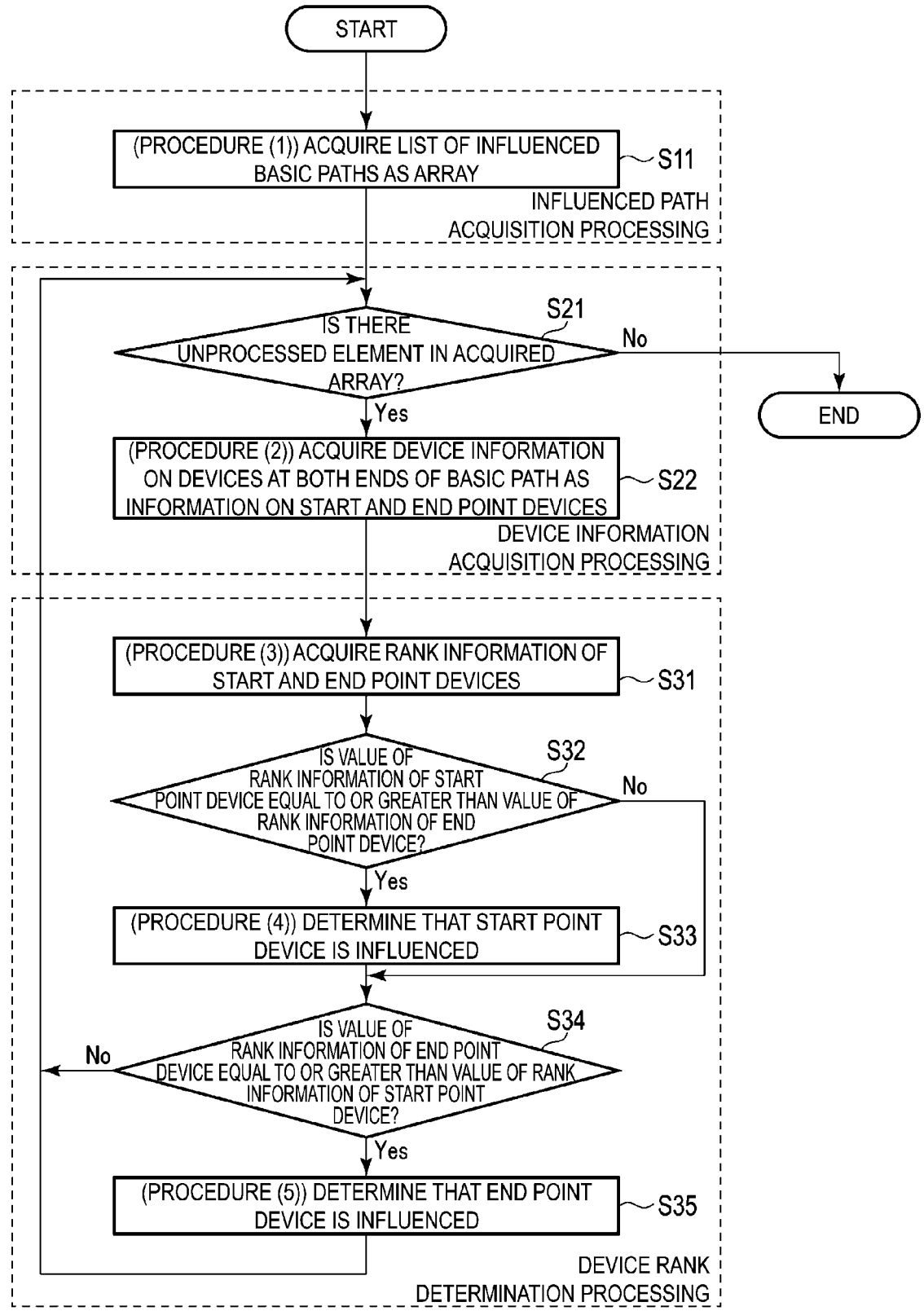
FIG. 3 is a flowchart showing an example of a processing operation of the network management apparatus according to the first embodiment of the present invention.

FIG. 3 is a flowchart showing an example of a processing operation of the network management apparatus according to the first embodiment of the present invention.

Prior to the processing shown in FIG. 3, the influenced path calculation processing unit 11 of the fault influence determination processing unit 10 calculates objects in the logical layer corresponding to objects relating to a location where a fault has occurred in the physical layer as basic paths influenced by the fault based on facility information stored in the entity database 30. Here, when a fault (failure) has occurred in one device in the physical layer, a plurality of NCs in the logical layer corresponding to this device are calculated as basic paths influenced by the fault. Hereinafter, a device and NCs in the logical layer corresponding to the device will be described as being in connection relationships.

Next, the following S11 is executed as influenced path acquisition processing. The influenced path acquisition processing unit 12a acquires the calculated list of basic paths influenced by the fault as an array from the network facility information (S11).

Next, the following S21 and S22 are executed as device acquisition processing. If there is an unprocessed element in the subsequent processing among NCs which are elements of the array acquired in S11 (YES in S21), the device information acquisition processing unit 12b acquires a device connected to one end of a basic path which is one of the unprocessed elements from the network facility information as information on a start point device and acquires information on a device connected to the other end of the basic path from the network facility information as information on an end point device (S22).

Next, the following S31 to S35 are executed as device rank determination processing. The device rank determination processing unit 12c acquires rank information of the start point device and rank information of the end point device indicated by the information acquired in S22 from the network facility information (S31).

If the value of the rank information of the start point device is equal to or greater than the value of the rank information of the end point device (YES in S32), the device rank determination processing unit 12c determines that the start point device indicated by the information acquired in S22 is a device influenced by the occurrence of the fault (S33).

If the value of the rank information of the end point device is equal to or greater than the value of the rank information of the start point device (YES in S34) when the determination of S32 is NO or after S33, the device rank determination processing unit 12c determines that the end point device indicated by the information acquired in S22 is a device influenced by the occurrence of the fault (S35).

When the determination of S34 is NO, or after S35, the processing returns to S21. Then, if there is another unprocessed element in the processing from S22, the processing from S22 is performed for an NC which is this unprocessed element.

When the determination of S21 is NO, that is, when all elements of the array acquired in S11 have been subjected to the processing from S22, the series of processing ends.

Figure 4:
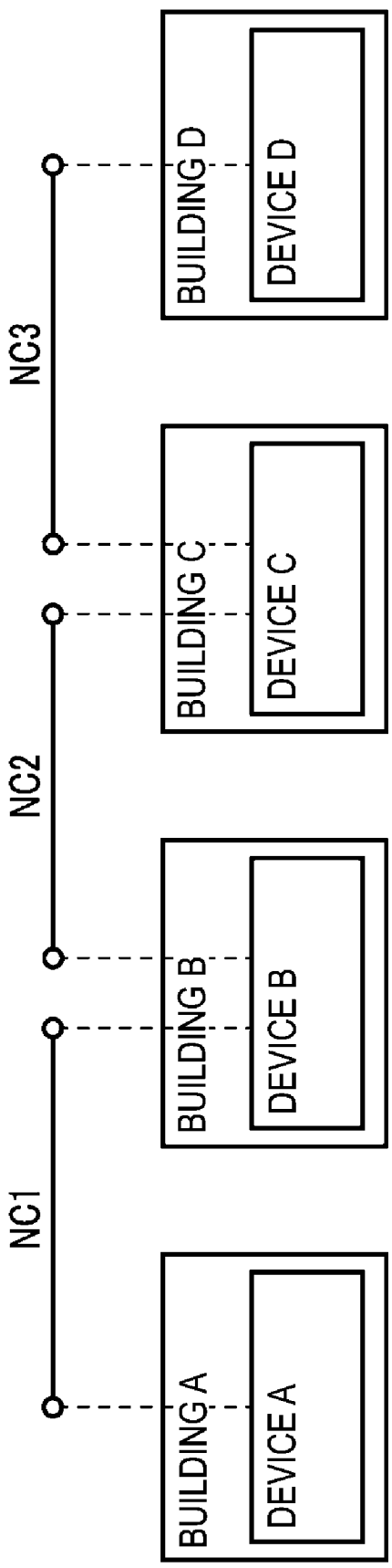
FIG. 4 is a diagram illustrating exemplary connection relationships between devices and communication paths.

Next, an example of processing for a specific configuration will be described. FIG. 4 is a diagram illustrating exemplary connection relationships between devices and communication paths.

Here, it is assumed that a device A housed in a building "building A," a device B housed in a building "building B," a device C housed in a building "building C," and a device D housed in a building "building D" are provided as illustrated in FIG. 4.

It is also assumed that one end of an object NC1 in a logical layer is connected to the device A, the device B is connected to the other end of the object NC1, one end of an object NC2 in the logical layer is connected to the device B, the device C is connected to the other end of the object NC2, one end of the object NC3 in the logical layer is connected to the device C, and the device D is connected to the other end of the object NC3.

Figure 5:
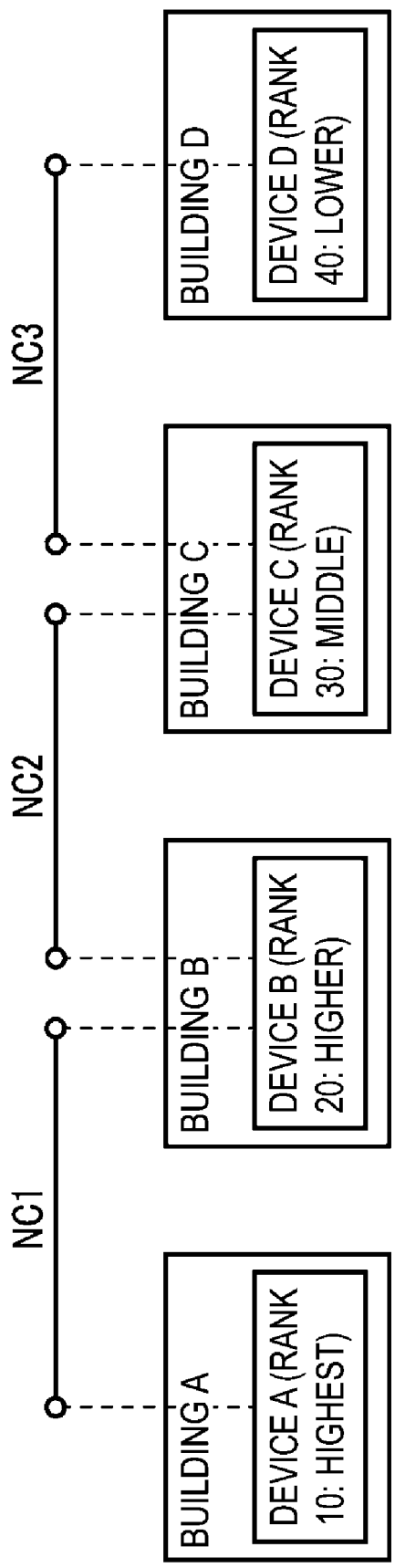
FIG. 5 is a diagram illustrating an example of rank information of each device.

FIG. 5 is a diagram illustrating an example of rank information of each device. As illustrated in FIG. 5, the value of the rank information of each device in the above configuration is defined as follows.

Device A: 10
Device B: 20
Device C: 30
Device D: 40

That is, this rank information indicates that the device A is of the highest rank, the device B is of a higher rank, the device C is of a middle rank, and the device D is of the lowest rank.

In S11, the influenced path acquisition processing due to a failure of the device B is executed and influenced paths which are a list of basic paths influenced by a fault are acquired as an array as shown below.

Influenced paths: NC2, NC1

Figure 6:
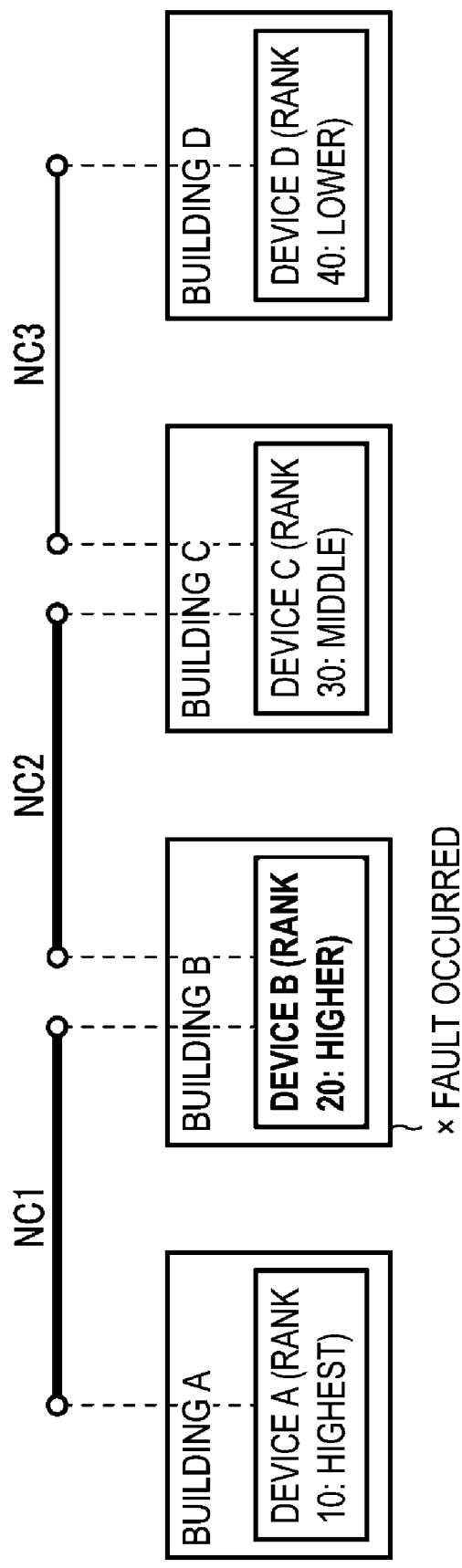
FIG. 6 is a diagram illustrating an example of influenced paths.

FIG. 6 is a diagram illustrating an example of the influenced paths. The device B shown in bold in FIG. 6 corresponds to a device in which a failure has occurred and NC1 and NC2 shown as bold lines correspond to the influenced paths.

In S22, a start point device and an end point device are acquired for the first influenced path NC2 as follows.

Start point device: Device B
End point device: Device C

In S31, the value of the rank information of the start point device and the value of the rank information of the end point device are acquired as follows.

Start point device: Device B (rank information: 20)
End point device: Device C (rank information: 30)

Because the value "20" of the rank information of the device B which is the start point device is not equal to or greater than the value "30" of the rank information of the device C which is the end point device (No in S32), the processing proceeds to S34.

Because the value "30" of the rank information of the device C which is the end point device is equal to or greater than the value "20" of the rank information of the device B which is the start point device (YES in S34), it is determined in S35 that the device C which is the end point device is a device influenced by the fault.

Figure 7:
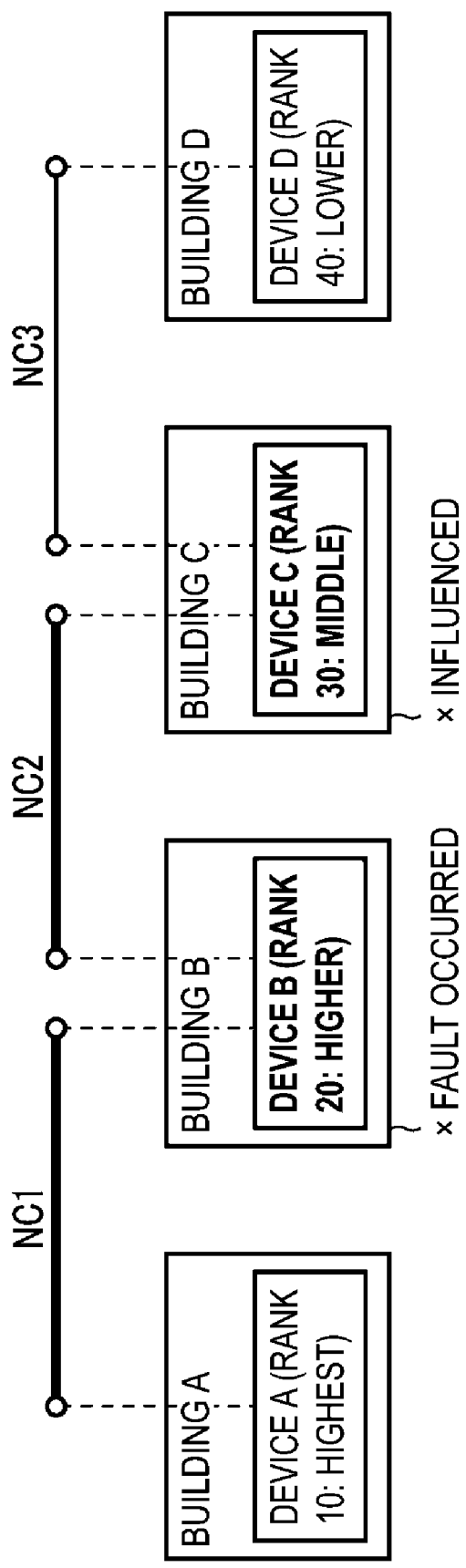
FIG. 7 is a diagram illustrating an example of a device influenced by a fault.

FIG. 7 is a diagram illustrating an example of a device influenced by a fault. The device C shown in bold in FIG. 7 corresponds to a device influenced by the fault.

The remaining NC obtained in S11, NC1, is also subjected to the processing from S22.

As a result of this processing, it is determined that the device B connected to NC1 is a device influenced by the fault.

Because this device B is the device itself in which the failure has occurred, the other device C that has been determined to be influenced is a final determination result of a device influenced by the fault that has occurred in the device B. It is also determined that the other devices A and D are devices not influenced by the fault.

That is, the location where a fault has occurred among the devices A, B, C and D and whether these are influenced by the fault are as follows.

Figure 8:
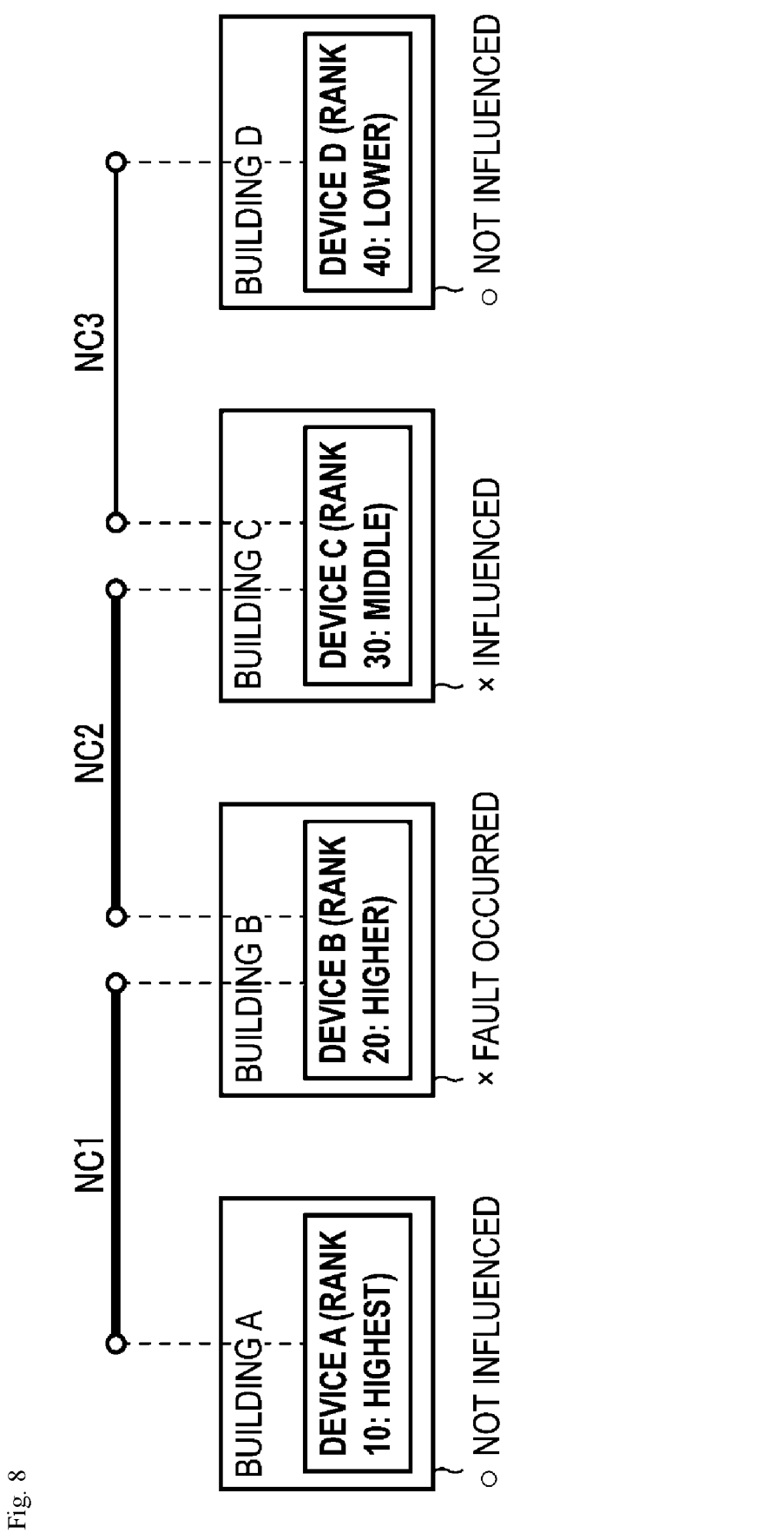
FIG. 8 is a diagram illustrating an example of a determination result on the influence of a fault.

Device A: Not influenced by fault
Device B: Fault has occurred
Device C: Influenced by fault
Device D: Not influenced by fault FIG. 8 is a diagram illustrating an example of a determination result on the influence of the fault. FIG. 8 shows that whether the devices A, B, C and D are influenced by the fault has been determined as described above.

Second Embodiment

Next, a second embodiment will be described. Detailed description of components in the present embodiment in common with the first embodiment will be omitted.

Figure 9:
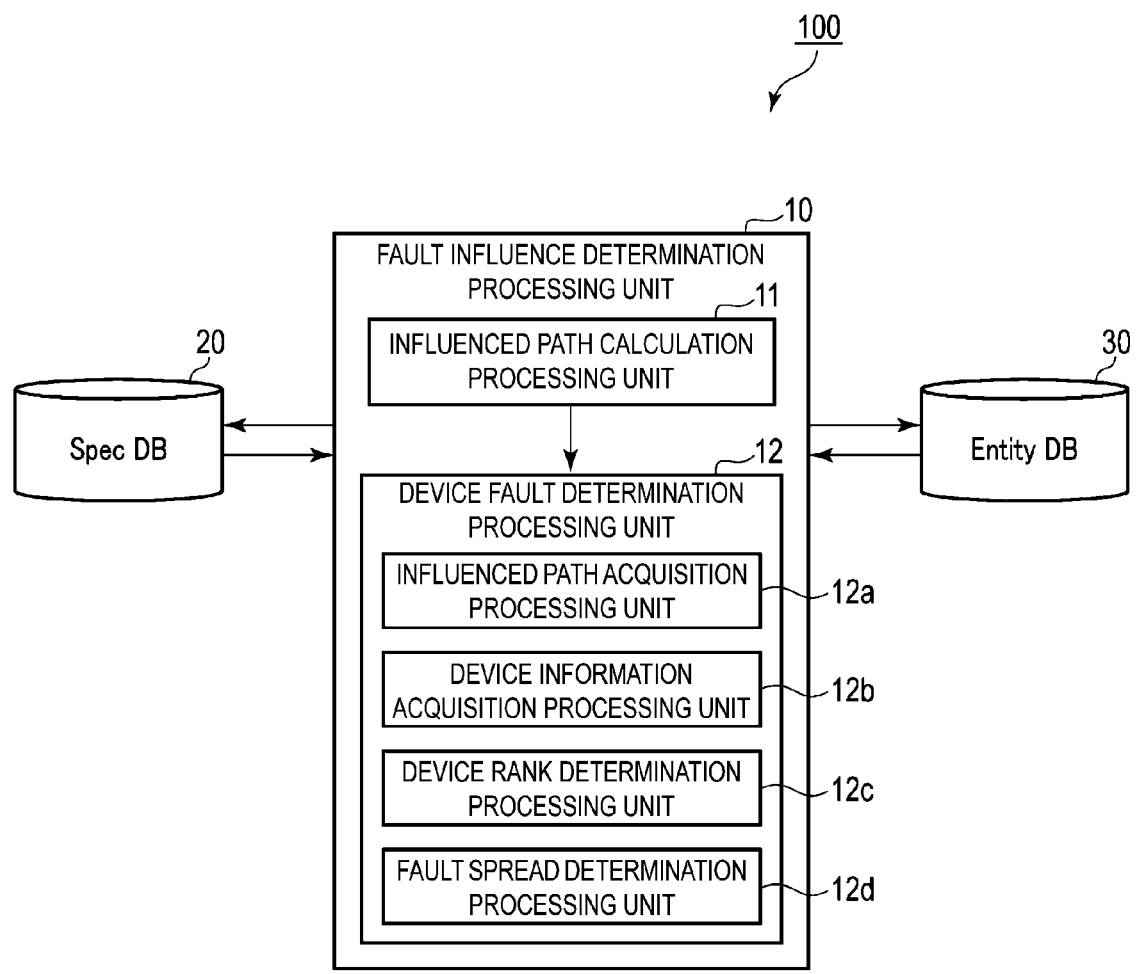
FIG. 9 is a diagram illustrating an exemplary application of a network management apparatus according to a second embodiment of the present invention.

FIG. 9 is a diagram illustrating an exemplary application of a network management apparatus according to the second embodiment of the present invention.

As compared to the configuration described in the first embodiment, a device fault determination processing unit 12 in a fault influence determination processing unit 10 in the network management apparatus 100 according to the second embodiment of the present invention further includes a fault spread determination processing unit 12d as illustrated in FIG. 9.

In the second embodiment, rank information of devices is taken into consideration and a logic for determining, when a device of a lower rank or an identical rank is connected to a device that has been determined to be influenced by a fault according to the first embodiment, that the connected device is also influenced by the fault is achieved in a unified manner, regardless of services and network configurations.

As a result, in a configuration in which other devices are connected to devices connected to both ends of an NC which is an influenced path, the influence of the occurrence of a fault can be more accurately determined and the influence determination task in monitoring and maintenance work can be further reduced.

The second embodiment achieves a logic that the influence of a failure of a higher ranked device spreads to lower ranked devices below it, such that devices that are not directly connected to a failed device can also be determined to be influenced by the fault.

Figure 10:
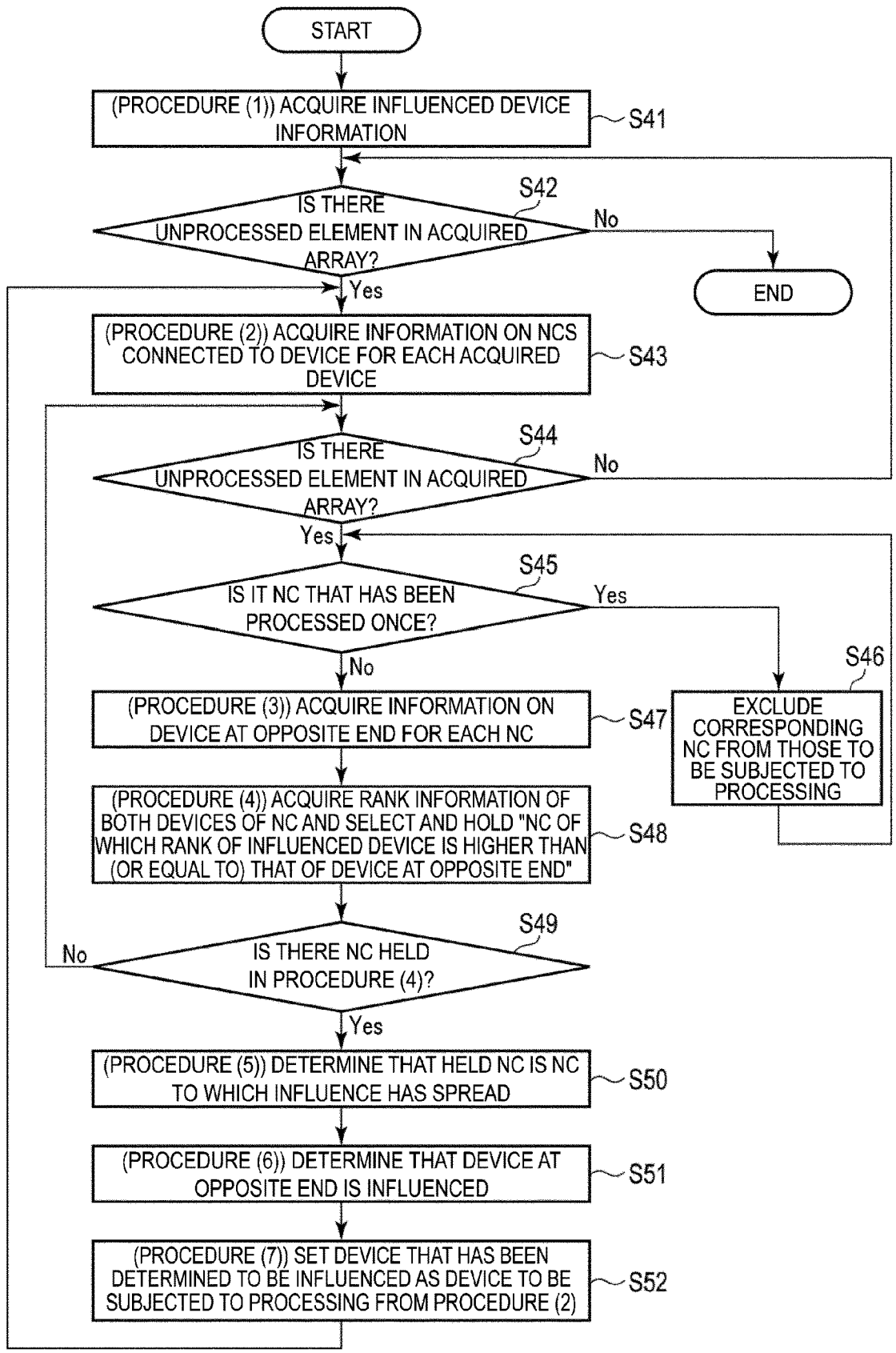
FIG. 10 is a flowchart showing an example of a processing operation of a fault spread determination unit in the network management apparatus according to the second embodiment of the present invention.

FIG. 10 is a flowchart showing an example of a processing operation of a fault spread determination unit in the network management apparatus according to the second embodiment of the present invention.

After the processing shown in the first embodiment, the fault spread determination processing unit 12d acquires information on a device in which a fault has occurred and a device that has been determined to be influenced by the fault from the network facility information (S41). If there is an unprocessed element in the subsequent processing among the devices that are elements of an array indicated by the acquired information (YES in S42), the fault spread determination processing unit 12d acquires, for each device corresponding to the unprocessed element, information on NCs connected to the device as an array from the network facility information (S43).

If there is an unprocessed element in the subsequent processing among the NCs that are elements of the array indicated by the information acquired in S43 (YES in S44), an NC that has been processed once in the processing from S47 among NCs indicated by the information acquired in S43 is excluded from those to be subjected to the subsequent processing (S45→S46) and the processing returns to S45.

For each NC other than those processed above among the NCs indicated by the information acquired in S43, the fault spread determination processing unit 12*d* acquires information on a device at the opposite end connected to the NC (S47). When one end of an NC indicated by the information acquired in S43 is connected to the device indicated by the information acquired in S41, the device at the opposite end refers to a device that is connected to the other end of the NC.

The fault spread determination processing unit 12*d* acquires rank information of the two devices, that is, rank information of the device indicated by the information acquired in S41 and rank information of a device at the opposite end with respect to the device, and when "the rank of the influenced device is higher than (or equal to) the rank of the device at the opposite end and there is an NC connected to these devices," selects this NC from the NCs indicated by the information acquired in S43 and holds information indicating the selected NC in an internal memory (S48).

When there is an NC held in S48 (YES in S49), the fault spread determination processing unit 12*d* determines that the NC held in S48 is an NC to which the influence of the fault has spread (S50).

Then, the fault spread determination processing unit 12*d* newly determines that a device at the other end connected to this NC is a device influenced by the fault (S51).

The fault spread determination processing unit 12*d* sets the device that has been determined to be influenced in S51 as a device to be subjected to processing from S43 (S52) and returns to S43. The processing from S43 is performed on this set device.

Figure 11:
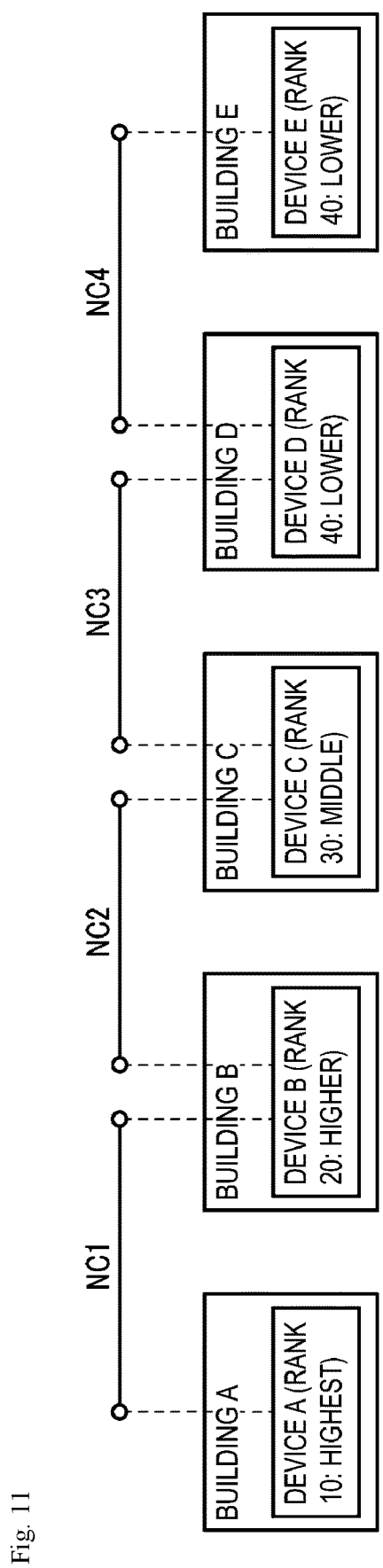
FIG. 11 is a diagram illustrating exemplary connection relationships between devices and communication paths.

Next, an example of processing for a specific configuration will be described. FIG. 11 is a diagram illustrating exemplary connection relationships between devices and communication paths.

In the second embodiment, it is assumed that a device E housed in a building "building E" is provided in addition to the devices A to D described above in the first embodiment as illustrated in FIG. 11.

It is also assumed that one end of an object NC4 in the logical layer is connected to the device D and the device E is connected to the other end of the object NC4, with the device A, NC1, device B, NC2, device C, NC3, and device D being connected as described in the first embodiment. Further, it is assumed that the values of the rank information of the devices A to D are the same as those described in the first embodiment and the value of the rank information of the device E is 40, which is the same as the value of the rank information of the device D.

In this configuration, the location where a fault has occurred among the devices A, B, C, D, and E and whether these are influenced by the fault are determined as follows through the steps of processing described in the first embodiment.

Figure 12:
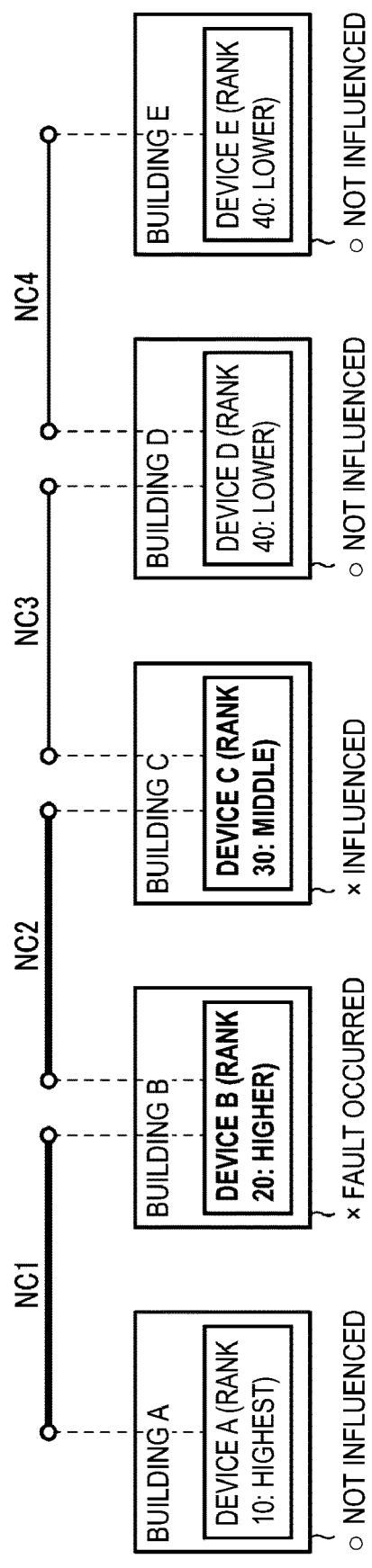
FIG. 12 is a diagram illustrating an example of a device influenced by a fault.

Device A: Not influenced by fault
Device B: Fault has occurred
Device C: Influenced by fault
Devices D and E: Not influenced by fault FIG. 12 is a diagram illustrating an example of a device influenced by a fault. The device B shown in bold in FIG. 12 corresponds to a device in which a fault has occurred and the device C shown in bold in FIG. 12 corresponds to a device that has been determined to be influenced by the fault according to the first embodiment.

In S41, the fault spread determination processing unit 12*d* acquires information on a device in which a fault has occurred and information on a device that has been determined to be influenced by the fault as follows.

Device in which fault has occurred: Device B
Device influenced by fault: Device C In S43, the fault spread determination processing unit 12*d* acquires, for each device indicated by the acquired information, information indicating NCs connected to the device. Here, processing relating to the device C will be described as an example.

In S43, the fault spread determination processing unit 12*d* acquires information indicating NC2 and NC3 which are NCs connected to the device C indicated by the information acquired in S41.

In S47, the fault spread determination processing unit 12*d* acquires information indicating the device B which is a device at the opposite end via NC2 indicated by the information acquired in S43 as seen from the device C which is the first device indicated by the information acquired in S41.

Similarly, in S47, the fault spread determination processing unit 12*d* acquires information indicating the device D which is a device at the opposite end via NC3 indicated by the information acquired in S43 as seen from the device C which is the second device indicated by the information acquired in S41.

In S48, the fault spread determination processing unit 12*d* does not hold information indicating NC2 because the comparison between the value "30" of the rank information of the device C indicated by the information acquired in S41 and the value "20" of the rank information of the device B which is at the opposite end via NC2 indicated by the information acquired in S43 as seen from the device C indicates that the rank of the device C influenced by the fault is lower than the rank of the device B at the opposite end.

On the other hand, in S48, the fault spread determination processing unit 12*d* holds information indicating NC3 because the comparison between the value "30" of the rank information of the device C indicated by the information acquired in S41 and the value "40" of the rank information of the device D which is at the opposite end via NC3 indicated by the information acquired in S43 as seen from the device C indicates that the rank of the device C influenced by the fault is higher than the rank of the device D at the opposite end.

Figure 13:
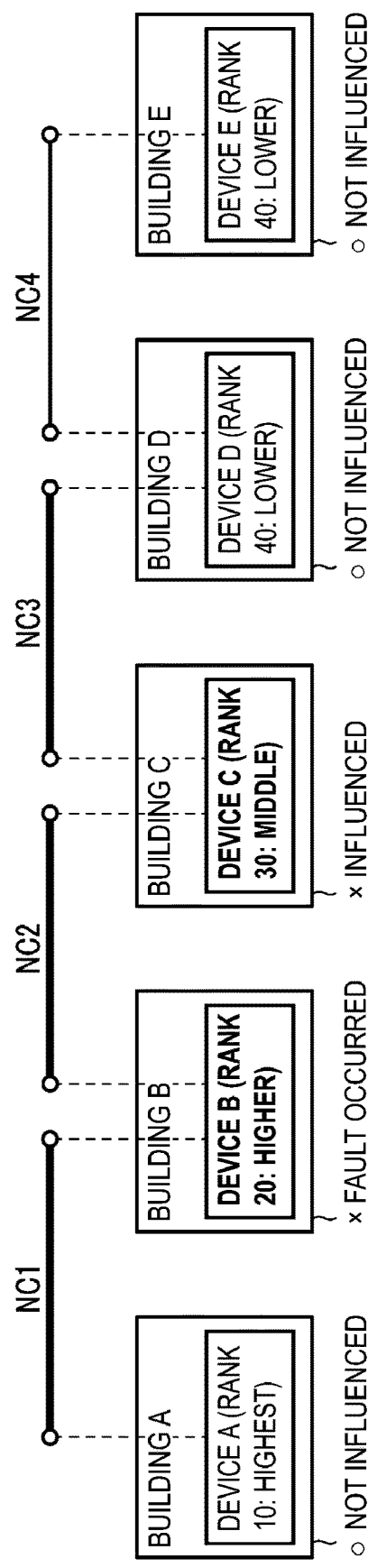
FIG. 13 is a diagram illustrating an example of a communication path to which the influence of a fault has spread.

In S50, the fault spread determination processing unit 12*d* determines that NC3 indicated by the information held in S48 is an NC to which the influence of the fault has spread. FIG. 13 is a diagram illustrating an example of a communication path to which the influence of a fault has spread. In FIG. 13, NC3 which is an NC to which the influence of the fault has spread is shown as a bold line.

Figure 14:
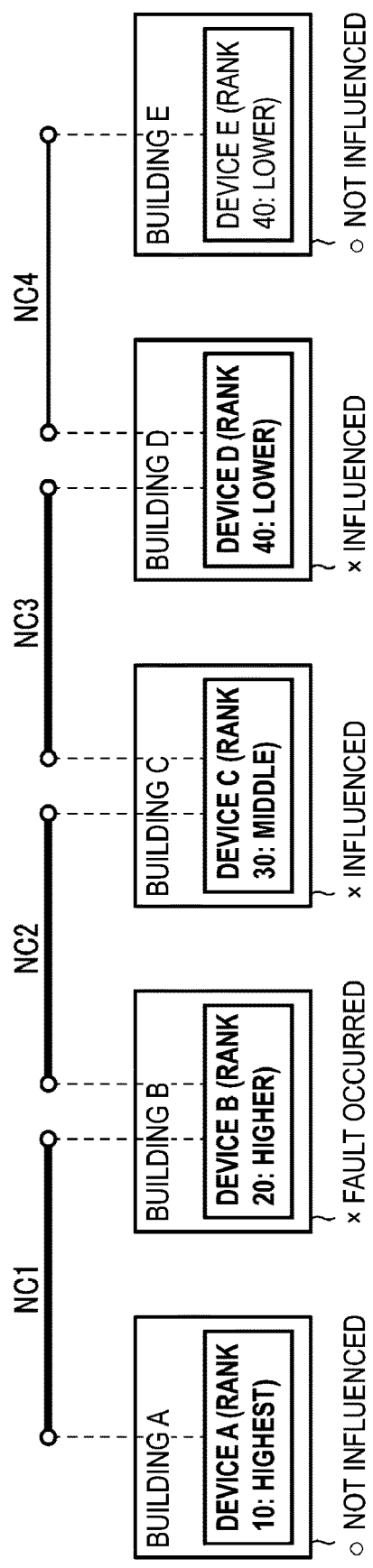
FIG. 14 is a diagram illustrating an example of a device influenced by a fault.

In S51, the fault spread determination processing unit 12*d* determines that the device D which is at the opposite end via NC3 indicated by the information held in S48 as seen from the device C indicated by the information acquired in S41 is a device influenced by the fault. FIG. 14 is a diagram illustrating an example of a device influenced by a fault. In FIG. 14, the device D influenced by the fault is shown in bold.

In S52, the fault spread determination processing unit 12*d* sets the device D that has been determined in S48 to be influenced by the fault as a device that is to be subjected to the processing from S43.

With this setting, in S43, the fault spread determination processing unit 12d acquires information indicating NC3 and NC4 connected to the device D set in S48.

Because NC3 which is the first of the NCs indicated by the information acquired in S43 is an NC that has been subjected to the processing from S47, the fault spread determination processing unit 12d determines in S45 that NC3 is an NC that is not to be subjected to the subsequent processing. On the other hand, NC4 which is the second of the NCs indicated by the information acquired in S43 is not an NC that has been subjected to the processing from S47. Therefore, in S47, the fault spread determination processing unit 12d acquires information indicating the device E which is at the opposite end via NC4 indicated by the information acquired in S43 as seen from the device D set in S52.

The value "40" of the rank information of the device E which is at the opposite end via NC4 indicated by the information acquired in S43 as seen from the device D set in S52 is the same as the value "40" of the rank information of the device D. That is, because the device D is of an identical rank as the device E at the opposite end, the fault spread determination processing unit 12d holds information indicating NC4 in S48.

In S50, the fault spread determination processing unit 12d determines that NC4 indicated by the information held in S48 is a device influenced by the fault.

In S51, the fault spread determination processing unit 12d determines that the device E which is at the opposite end via NC4 indicated by the information held in S48 as seen from the device D set in S52 is a device influenced by the occurrence of the fault.

Figure 15:
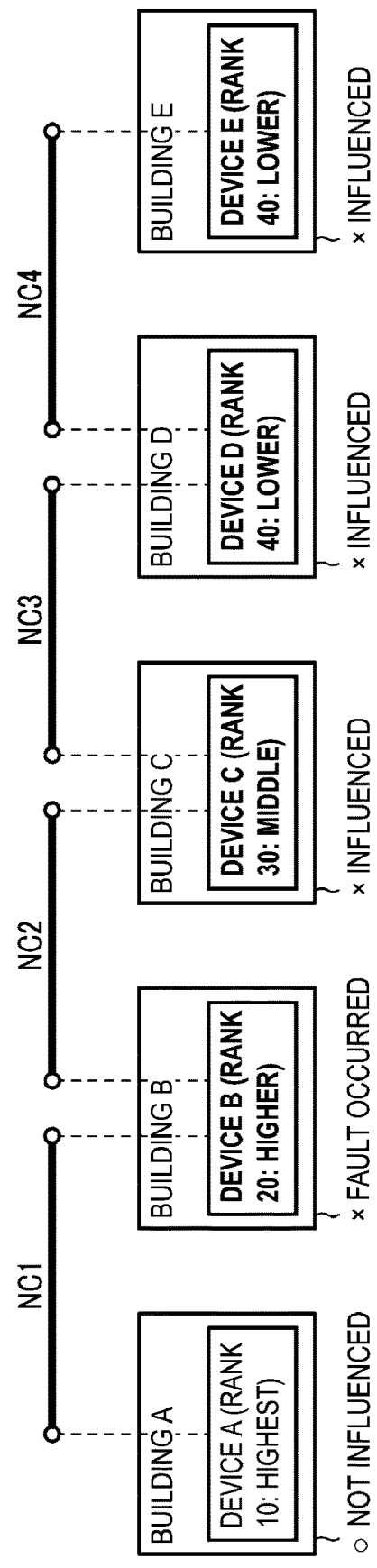
FIG. 15 is a diagram illustrating an example of a determination result on the influence of a fault.

All the other devices acquired in S41, the device B here, are also subjected to the processing from S42, such that the final determination result on the influence of the fault is as follows. FIG. 15 is a diagram illustrating an example of a determination result on the influence of a fault. The determination result illustrated in FIG. 15 differs in that it is determined that the devices D and E are devices influenced by the fault, as compared to when the steps of processing described in the first embodiment have been performed. That is, it is determined that the influence has spread to lower ranked devices, as compared to the first embodiment.

Device A: Not influenced by fault
Device B: Fault has occurred
Devices C, D, and E: Influenced by fault Third Embodiment Next, a third embodiment will be described. Detailed description of components in the present embodiment in common with the second embodiment will be omitted.

Figure 16:
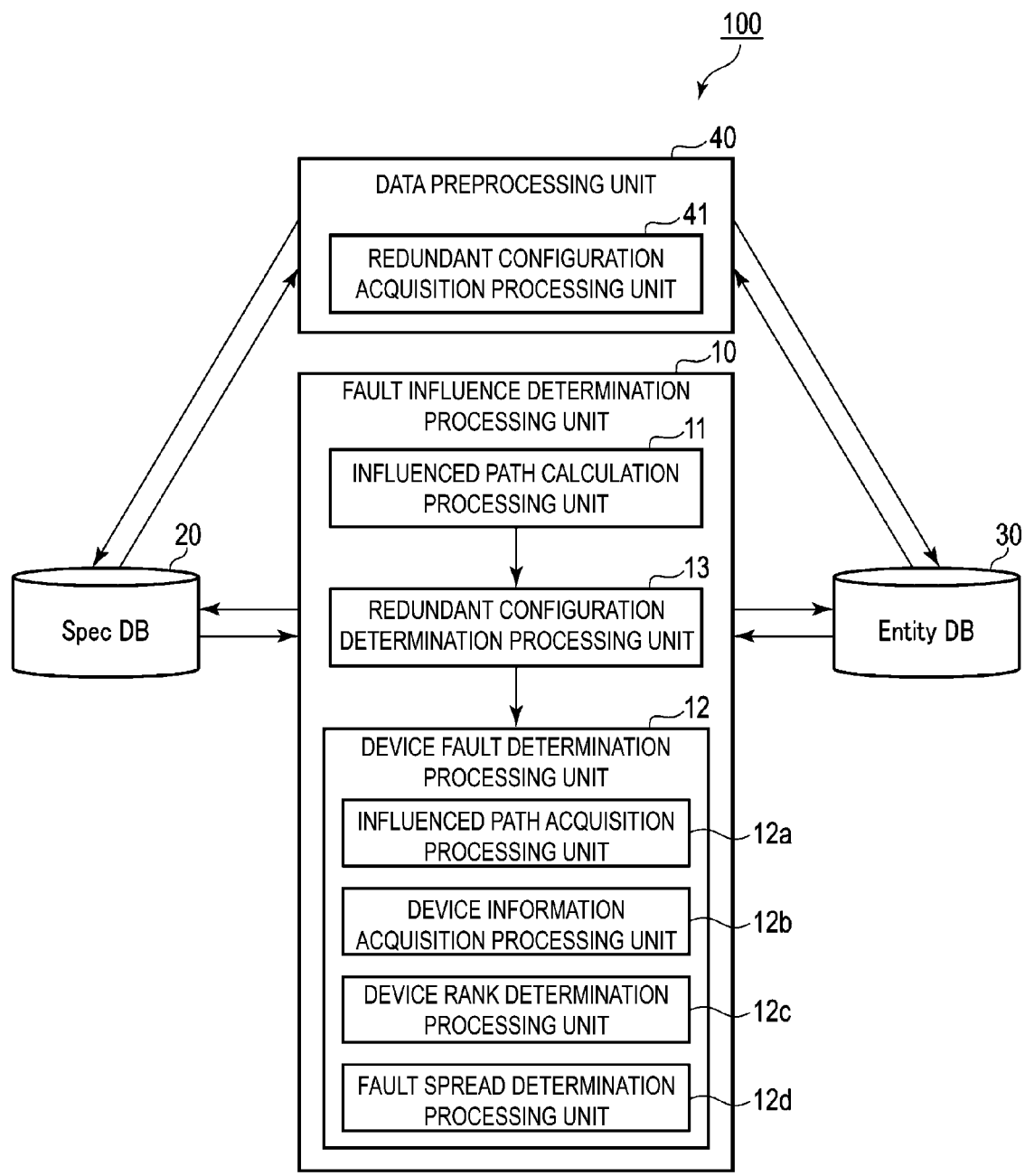
FIG. 16 is a diagram illustrating an exemplary application of a network management apparatus according to a third embodiment of the present invention.

FIG. 16 is a diagram illustrating an exemplary application of a network management apparatus according to the third embodiment of the present invention.

As compared to the configuration described in the second embodiment, a fault influence determination processing unit 10 in a network management apparatus 100 according to the third embodiment of the present invention includes a redundant configuration determination processing unit 13 and the network management apparatus 100 includes a data preprocessing unit 40 in addition to the fault influence determination processing unit 10 as illustrated in FIG. 16. The data preprocessing unit 40 includes a redundant configuration acquisition processing unit 41.

In the third embodiment, rank information of devices is taken into consideration and a logic for determining a redundant configuration and a logic for determining whether a lower ranked device in the redundant configuration is one-side system failure or both-side system failure are achieved in a unified manner, regardless of services and network configurations.

As a result, in a configuration in which higher ranked devices and a lower ranked device form a redundant configuration, the influence of a fault can be more accurately determined and the influence determination task in monitoring and maintenance work can be further reduced.

Figure 17:
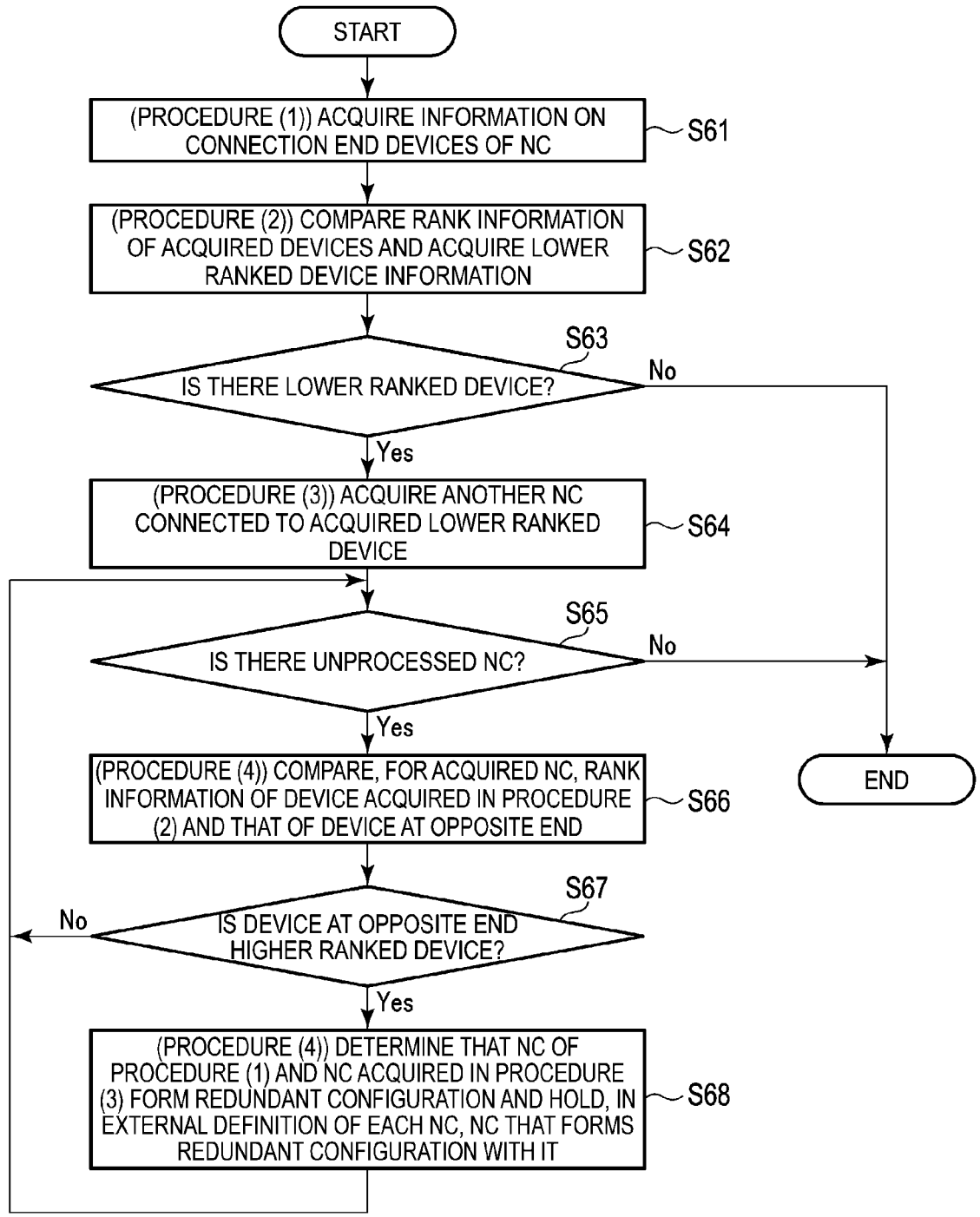
FIG. 17 is a flowchart showing an example of a processing operation of a redundant configuration acquisition unit in the network management apparatus according to the third embodiment of the present invention.

FIG. 17 is a flowchart showing an example of a processing operation of a redundant configuration acquisition unit in the network management apparatus according to the third embodiment of the present invention.

First, the redundant configuration acquisition processing unit 41 acquires information on a plurality of devices that are connection end devices of an NC in a basic path list from network facility information (S61).

The redundant configuration acquisition processing unit 41 compares the values of rank information of the devices indicated by the information acquired in S61, and if there is a lower ranked device, acquires information on this device from the entity database 30 (S62).

If information on a lower ranked device is acquired in S62 (YES in S63), the redundant configuration acquisition processing unit 41 acquires information on another NC connected to the lower ranked device indicated by the information acquired in S62 from the network facility information (S64).

If there is an unprocessed NC in the subsequent processing (YES in S65), the redundant configuration acquisition processing unit 41 compares, for the NC indicated by the information acquired in S63, the value of the rank information of the device indicated by the information acquired in S62 and the value of rank information of a device which is at the opposite end of the NC with respect to the indicated device (S66).

If the result of this comparison indicates that the rank of the device at the opposite end is higher than that of the device indicated by the information acquired in S62 (YES in S67), the redundant configuration acquisition processing unit 41 determines that the NC indicated by the information acquired in S61 and the NC indicated by the information acquired in S63 form a redundant configuration and hold, in an external definition of each NC that is a definition of network facility information relating to the NC, an NC that forms a redundant configuration with the NC (S68).

After S68 or when the determination of S67 is NO, the processing returns to determination of S65. When the determination of S63 or S65 is NO, the series of redundant configuration acquisition processing ends.

Figure 18:
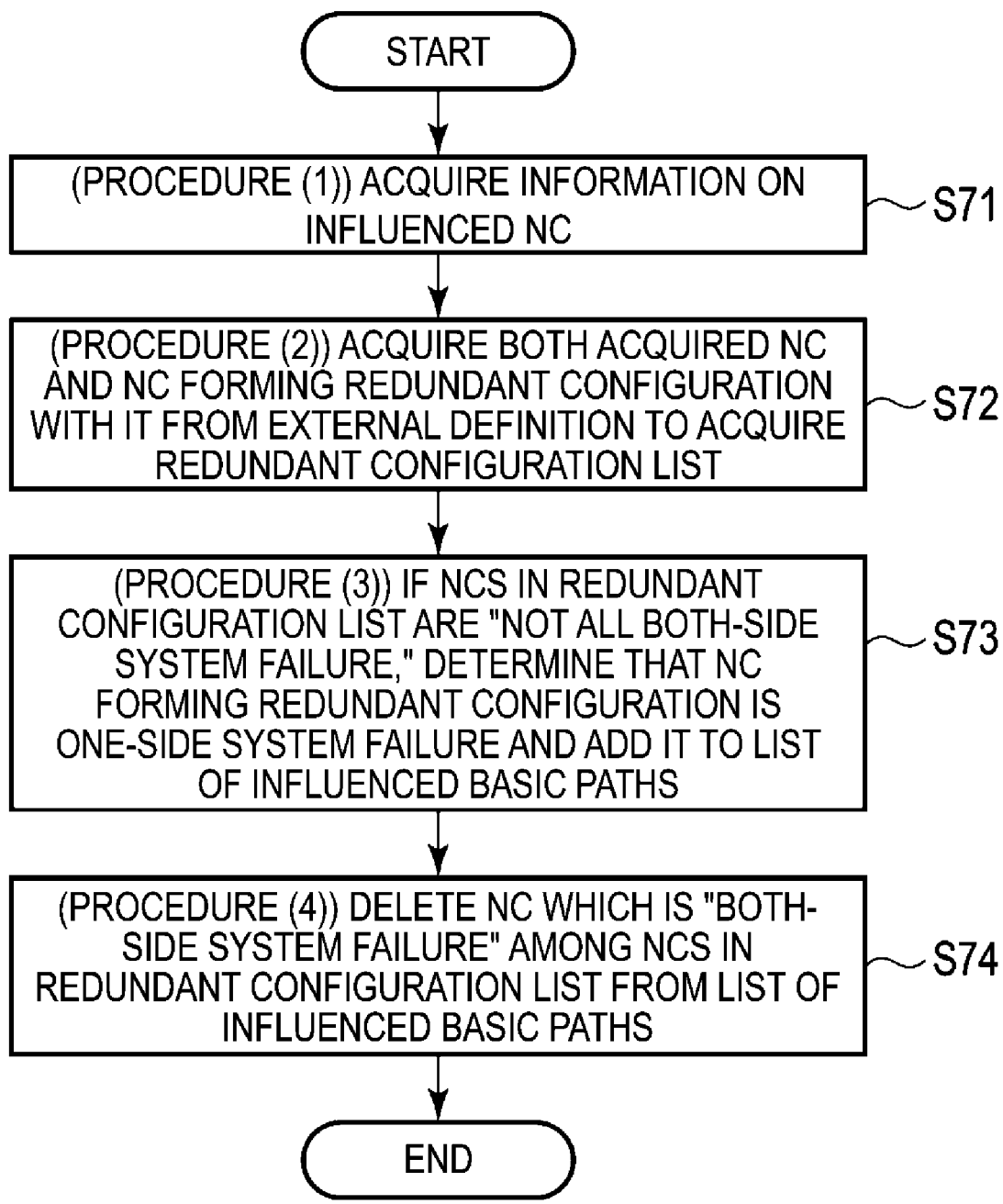
FIG. 18 is a flowchart showing an example of a processing operation of a redundant configuration determination processing unit in the network management apparatus according to the third embodiment of the present invention.

FIG. 18 is a flowchart showing an example of a processing operation of the redundant configuration determination processing unit in the network management apparatus according to the third embodiment of the present invention.

The redundant configuration determination processing unit 13 acquires information indicating an NC that is influenced by a fault of a device from the entity database 30 (S71).

The redundant configuration determination processing unit 13 acquires the NC indicated by the information acquired in S71 and an NC, which has been determined to form a redundant configuration with the indicated NC by the redundant configuration acquisition processing, from an external definition to acquire a redundant configuration list (S72).

When a condition that all NCs indicated in the redundant configuration list obtained in S72 be "both-side system failure" is not satisfied, that is, when the NCs indicated in the redundant configuration list include an NC that is not both-side system failure, the redundant configuration determination processing unit 13 determines that the NC forming the redundant configuration is one-side system failure and adds information indicating this NC to the list of basic paths influenced by the fault (S73).

The redundant configuration determination processing unit 13 deletes information indicating the NC that is "both-side system failure" among the NCs indicated in the redundant configuration list acquired in S72 from the list of basic paths influenced by the fault (S74). Then, the redundant configuration determination processing ends.

Figure 19:
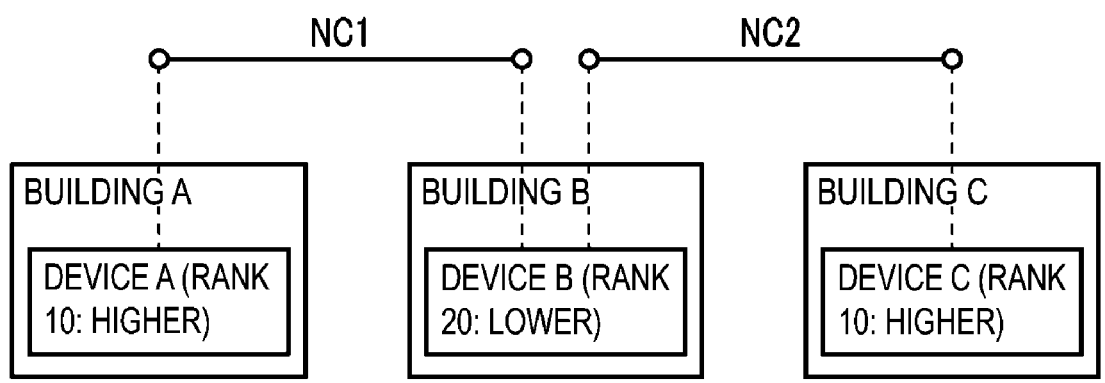
FIG. 19 is a diagram illustrating exemplary connection relationships between devices and communication paths.

Next, an example of processing for a specific configuration will be described. FIG. 19 is a diagram illustrating exemplary connection relationships between devices and communication paths.

In the third embodiment, it is assumed that the devices A, B, and C described in the first embodiment are provided as illustrated in FIG. 19.

It is also assumed that the device A, NC1, the device B, NC2, and the device C described above are connected as described in the first embodiment.

Further, it is assumed that the value of the rank information of the device A and the value of the rank information of the device B are the same as those described in the first embodiment, while the value of the rank information of the device C is 10, which is the same as the value of the rank information of the device A.

In S61 of the redundant configuration acquisition processing, the redundant configuration acquisition processing unit 41 acquires information indicating the device A and the device B which are connection end devices of NC1 indicated as a basic path.

In S62, the redundant configuration acquisition processing unit 41 compares the value "10" of the rank information of one device A indicated by the information acquired in S61 with the value "20" of the rank information of the other device B and acquires information indicating the lower ranked device B with the greater value.

In S64, the redundant configuration acquisition processing unit 41 acquires information indicating another NC2 connected to the lower ranked device B indicated by the information acquired in S62.

In S66, for NC2 indicated by the information acquired in S64, the redundant configuration acquisition processing unit 41 compares the value "20" of the rank information of the device B indicated by the information acquired in S62 with the value "10" of the rank information of the device C which is at the opposite end of NC2 with respect to the device B.

Because this comparison indicates that the device C at the opposite end is a higher ranked device than the device B indicated by the information acquired in S62, the redundant configuration acquisition processing unit 41 determines in S68 that NC1 indicated by the information acquired in S61 and NC2 indicated by the information acquired in S63 form a redundant configuration and holds information indicating NC2 that forms a redundant configuration with NC1 in an external definition of NC1 and holds information indicating NC1 that forms a redundant configuration with NC2 in an external definition of NC2.

Figure 20:
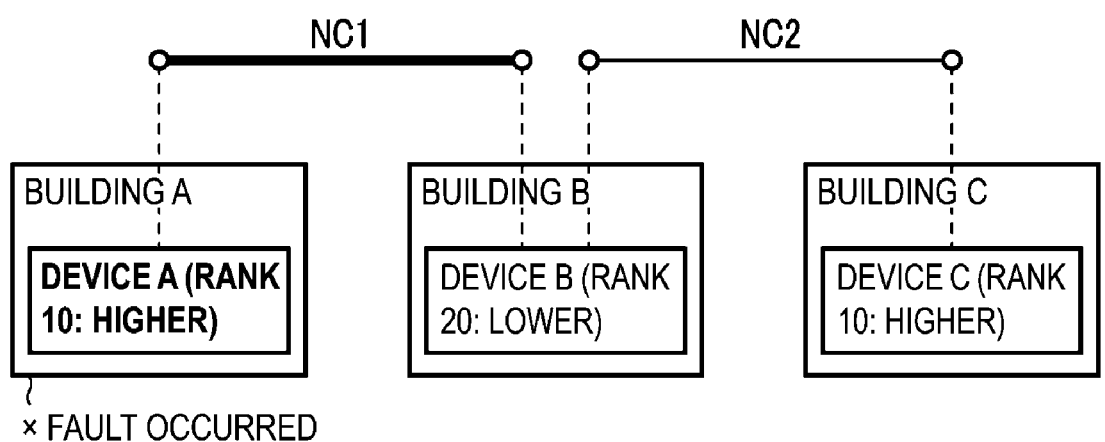
FIG. 20 is a diagram illustrating an example of a path influenced by a fault.

In S71 of the redundant configuration determination processing, the redundant configuration determination processing unit 13 acquires information indicating NC1 which is indicated as a basic path and which is a communication path influenced by a fault of the device A when the device A has failed. FIG. 20 is a diagram illustrating an example of a path influenced by a fault. FIG. 20 shows that the device A has failed as described above and that NC1 is a communication path influenced by the fault.

In S72, the redundant configuration determination processing unit 13 acquires information indicating NC1 indicated by the information acquired in S71 and NC2 that forms a redundant configuration with NC1 from the external definition and acquires a redundant configuration list indicated by the acquisition result.

Figure 21:
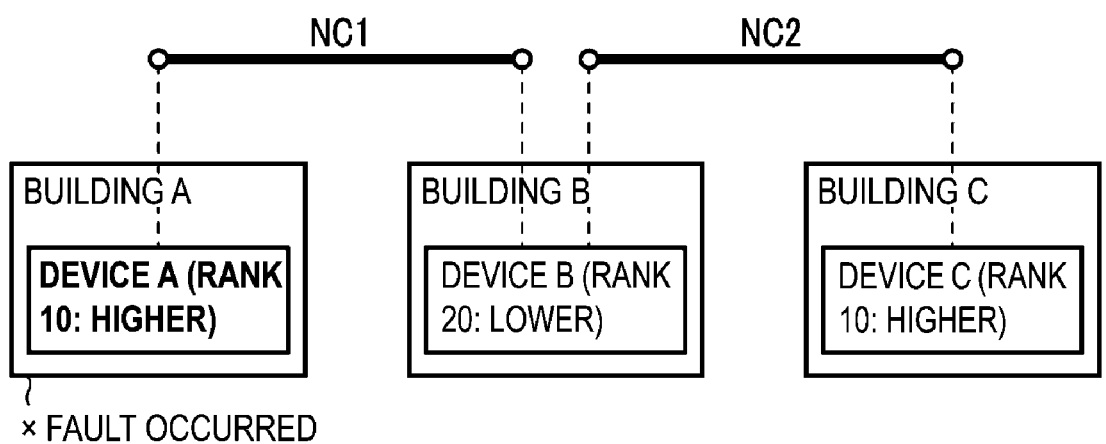
FIG. 21 is a diagram illustrating an example of a device indicating one-side system failure.

When a condition that all NC1 and NC2 indicated in the redundant configuration list acquired in S72 being "both-side system failure" is not satisfied, in S73, the redundant configuration determination processing unit 13 determines that NC2 that forms a redundant configuration with NC1 is one-side system failure and adds information indicating NC2 to a list of basic paths influenced by the fault. FIG. 21 is a diagram illustrating an example of a device indicating one-side system failure. FIG. 21 shows that NC2 has been determined to be one-side system failure as described above.

In S74, the redundant configuration determination processing unit 13 deletes information indicating NC1, which is "both-side system failure" among the NCs indicated in the redundant configuration list acquired in S72, from the list of basic paths influenced by the fault. The processes described in the first and second embodiments can be performed on the deleted result.

Figure 22:
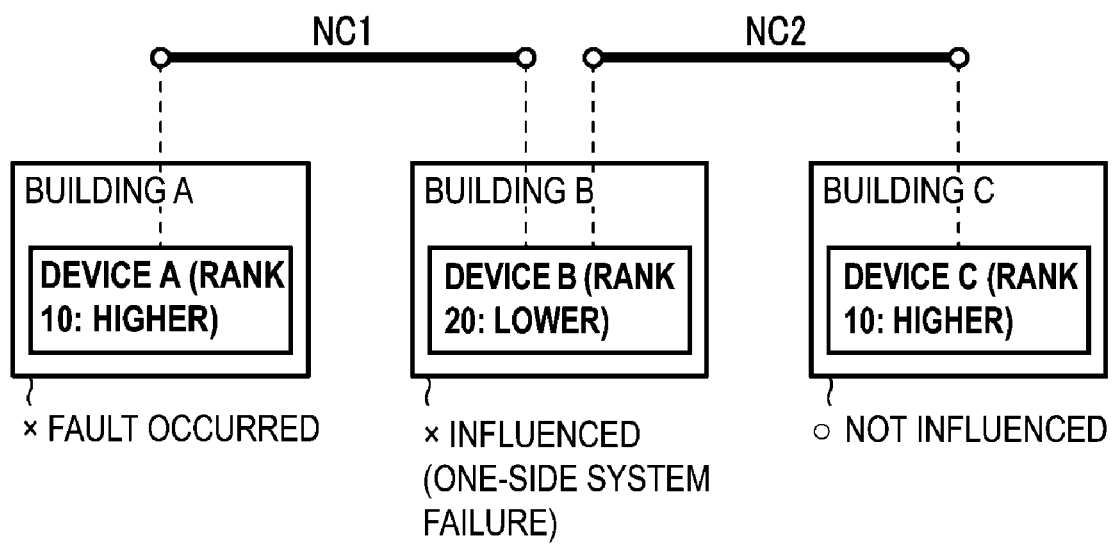
FIG. 22 is a diagram illustrating an example of a determination result on the influence of a fault.

A final determination result on the influence of the fault as a result of the above processing is as follows. FIG. 22 is a diagram illustrating an example of a determination result on the influence of the fault. Based on this result, it is determined according to the first embodiment that, for NC2, the higher ranked device A is not influenced by the failure (fault) of the device A and the lower ranked device B is influenced by the fault and it is determined according to the second embodiment that there is no particular spread of this influence.

Device A: Fault has occurred
Device B: Influenced by fault (one-side system failure)
Device C: Not influenced by fault FIG. 23 is a block diagram illustrating an example of a hardware configuration of a network management apparatus according to an embodiment of the present invention.

Figure 23:
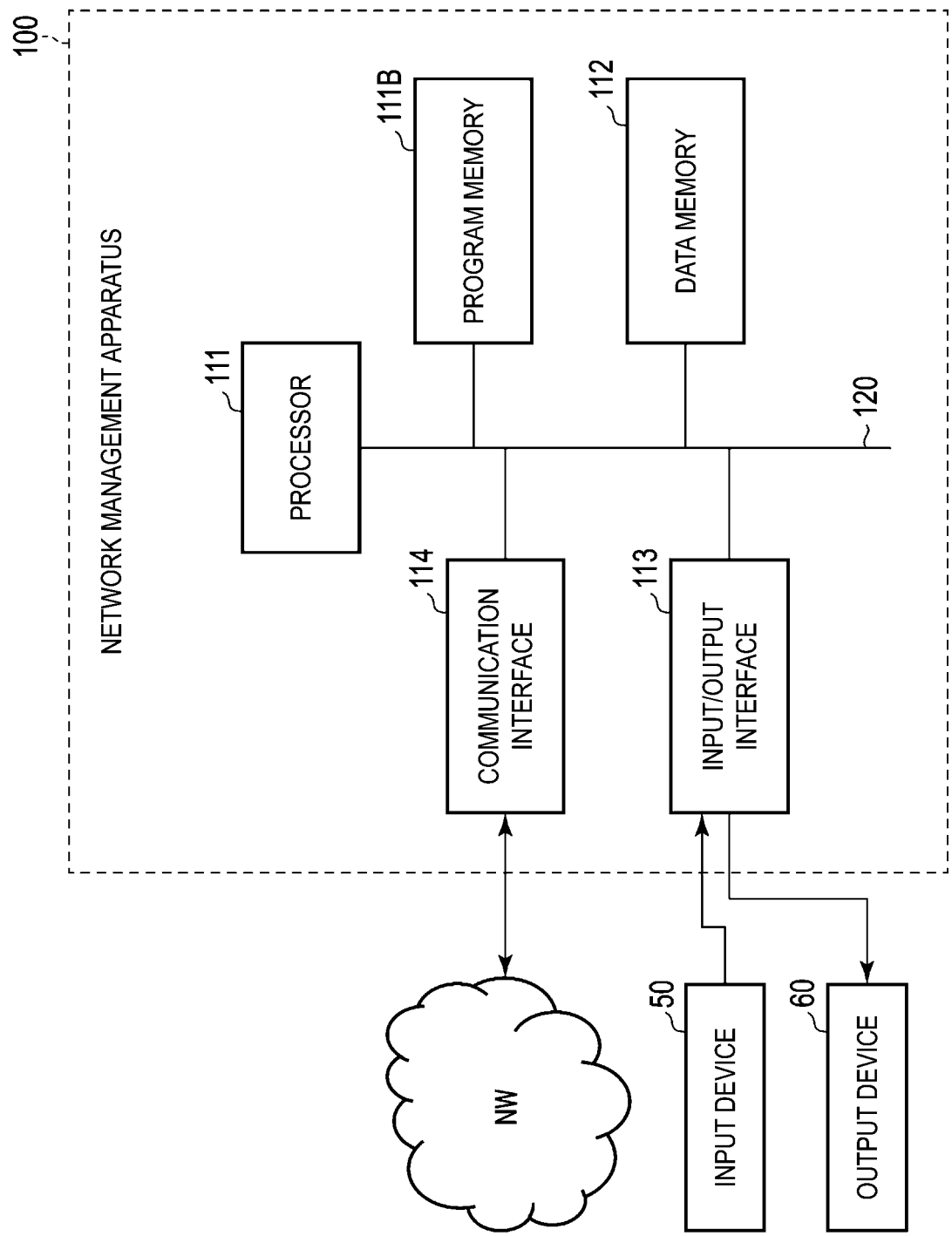
FIG. 23 is a block diagram illustrating an example of a hardware configuration of a network management apparatus according to an embodiment of the present invention.

In the example illustrated in FIG. 23, the network management apparatus 100 according to the above embodiments is constructed, for example, by a server computer or a personal computer, and includes a hardware processor 111A such as a CPU. A program memory 111B, a data memory 112, an input/output interface 113, and a communication interface 114 are connected to the hardware processor 111A via a bus 120.

The communication interface 114 includes, for example, one or more wireless communication interface units, and allows information to be transmitted and received to and from a communication network (NW). For example, an interface adopting a low power wireless data communication standard such as a wireless local area network (LAN) is used as the wireless interface.

An input device 50 and an output device 60 for an operator attached to the network management apparatus 100 are connected to the input/output interface 113.

The input/output interface 113 performs processing for receiving operation data that an operator has input through an input device 50 such as a keyboard, a touch panel, a touchpad, or a mouse and outputting and displaying output data to and on an output device 60 including a display device which uses liquid crystal, organic electro luminescence (EL), or the like. For the input device 50 and the output device 60, devices provided in the network management apparatus 100 may be used or input and output devices of other information terminals capable of communicating with the network management apparatus 100 via the network NW may be used.

The program memory 111B is a non-temporary tangible storage medium which uses, for example, a combination of a non-volatile memory that can be written and read at any time such as a hard disk drive (HDD) or a solid state drive (SSD) and a non-volatile memory such as a read only memory (ROM), and stores programs necessary to perform various control processing according to an embodiment.

The data memory 112 is a tangible storage medium which uses, for example, a combination of the non-volatile memory described above and a volatile memory such as a random access memory (RAM), and is used to store various data acquired and created during execution of various processing.

The network management apparatus 100 according to an embodiment of the present invention can be constructed as a data processing apparatus that includes the fault influence determination processing unit 10, the specification database 20, and the entity database 30 illustrated in FIG. 1 or 9 as processing functional units implemented by software or a data processing apparatus that includes the fault influence determination processing unit 10, the specification database 20, the entity database 30, and the data preprocessing unit 40 illustrated in FIG. 16.

The specification database 20 and the entity database 30 can be constructed by using the data memory 112 illustrated in FIG. 23. However, the areas of the specification database 20 and the entity database 30 are not indispensable components in the network management apparatus 100 and may be, for example, areas provided in an external storage medium such as a universal serial bus (USB) memory or a storage device such as a database server provided in a cloud.

Any of the processing functional units of the fault influence determination processing unit 10 and the data preprocessing unit 40 can be implemented by the hardware processor 111A reading and executing a program stored in the program memory 111B. Some or all of these processing functional units may be implemented in various other formats including integrated circuits such as an application specific integrated circuit (ASIC) or a field-programmable gate array (FPGA).

The methods described in the embodiments can be stored as programs (software means) that can be executed by a computer, for example, in a recording medium such as a magnetic disk (such as a floppy disk (trade name) or a hard disk), an optical disc (such as a CD-ROM, a DVD, or an MO), or a semiconductor memory (such as a ROM, a RAM, or a flash memory) or can be transmitted and distributed via a communication medium. The programs stored on the medium side also include a setting program for configuring software means to be executed by a computer (including not only the execution program but also tables and data structures) in the computer. A computer that implements the present apparatus performs the processing described above by reading a program recorded on a recording medium, and in some cases, constructing software means by a setting program and controlling the operation by the software means. The recording medium referred to in the present specification is not limited to a recording medium for distribution and includes a storage medium such as a magnetic disk or a semiconductor memory provided in a device connected inside the computer or connected via a network.

The present invention is not limited to the above embodiments and can be variously modified in the implementation stage without departing from the gist of the present invention. An appropriate combination of the embodiments can also be implemented, in which case a combination of their advantages can be achieved. The above embodiments include various inventions, which can be designed by combining constituent elements selected from a plurality of constituent elements disclosed here. For example, even if some constituent elements are removed from all the constituent elements shown in the embodiments, the configuration in which constituent elements are removed can be extracted as an invention if the problems can be solved and the advantages can be achieved.

REFERENCE SIGNS LIST

10 Fault influence determination processing unit
11 Influenced path calculation processing unit
12 Device fault determination processing unit
12a Influenced path acquisition processing unit
12b Device information acquisition processing unit
12c Device rank determination processing unit
12d Fault spread determination processing unit
13 Redundant configuration determination processing unit
40 Data preprocessing unit
41 Redundant configuration acquisition processing unit

The invention claimed is:

1. A network management apparatus comprising:
   a storage device configured to store information indicating connection relationships between a plurality of communication devices and communication paths in a network configuration and rank information indicating ranks of the plurality of communication devices in the network configuration, the information defining (a) relationships between objects in the physical layer, (b) relationships between objects in the logical layer, and (c) relationships between objects in the physical layer and objects in the logical layer;
   a processor; and
   a storage medium having computer program instructions stored thereon, when executed by the processor, perform to:
   when a fault occurs in a communication device of the plurality of communication devices, determine that a communication device influenced by the fault is within a fault influence range based on the information stored in the storage device including the rank information and the information defining (a) the relationships between objects in the physical layer, (b) the relationships between objects in the logical layer, and (c) the relationships between objects in the physical layer and objects in the logical layer.

2. The network management apparatus according to claim 1, wherein the computer program instructions further perform to
   acquire, when a fault occurs in the communication device, information indicating a communication path connected to the communication device where the fault occurs based on the information stored in the storage device,
   compare rank information of the communication device where the fault occurs and rank information of another communication device connected to the communication path indicated by the information acquired, and
   determine that the communication path indicated by the information acquired and the other communication device are within the fault influence range when a result of the comparison indicates that the other communication device is of a lower rank than the communication device where the fault occurs.

3. The network management apparatus according to claim 2, wherein the computer program instructions further perform to compare, when the communication device where the fault occurs or a communication device that is determined to be within the fault influence range is defined as a first communication device, rank information of the first communication device and rank information of a second communication device that is connected to the first communication device via a communication path and is not determined to be within the fault influence range, and further determine that the second communication device and the communication path between the first communication device and the second communication device are within the fault influence range when a result of the comparison indicates that the second communication device is of an identical rank with or a lower rank than the first communication device.

4. The network management apparatus according to claim 1, wherein the network configuration includes a redundant configuration where a plurality of communication devices of a higher rank are connected to one communication device of a lower rank via communication paths, and wherein the computer program instructions further program to determine that the one communication device of the lower rank in the redundant configuration is within the fault influence range as being one-side system failure when a fault occurs in some of the plurality of communication devices of the higher rank in the redundant configuration, and communication is possible between the one communication device of the lower rank in the redundant configuration and other communication devices of the higher rank in the redundant configuration, the other communication devices being included in the plurality of communication devices and being other than the some of the plurality of communication devices.

5. A network management method performed by a network management apparatus including a storage device configured to store information indicating connection relationships between a plurality of communication devices and communication paths in a network configuration and rank information indicating ranks of the plurality of communication devices in the network configuration, the information defining (a) relationships between objects in the physical layer, (b) relationships between objects in the logical layer, and (c) relationships between objects in the physical layer and objects in the logical layer the network management method comprising determining, when a fault occurs in a communication device of the plurality of communication devices, that a communication device influenced by the fault is within a fault influence range based on the information stored in the storage device including the rank information and the information defining (a) the relationships between objects in the physical layer, (b) the relationships between objects in the logical layer, and (c) the relationships between objects in the physical layer and objects in the logical layer.

6. The network management method according to claim 5, wherein the determining includes acquiring, when a fault occurs in the communication device, information indicating a communication path connected to the communication device where the fault occurs based on the information stored in the storage device, comparing rank information of the communication device where the fault occurs and rank information of another communication device connected to the communication path indicated by the information acquired, and determining that the communication path indicated by the information acquired and the other communication device are within the fault influence range when a result of the comparison indicates that the other communication device is of a lower rank than the communication device where the fault occurs.

7. The network management method according to claim 6, wherein the determining includes comparing, when the communication device where the fault occurs or a communication device that is determined to be within the fault influence range is defined as a first communication device, rank information of the first communication device and rank information of a second communication device that is connected to the first communication device via a communication path and is not determined to be within the fault influence range, and further determining that the second communication device and the communication path between the first communication device and the second communication device are within the fault influence range when a result of the comparison indicates that the second communication device is of an identical rank with or a lower rank than the first communication device.

8. A the network management apparatus according to claim 1.

* * * * *